(12) United States Patent
Christ et al.

(10) Patent No.: US 12,049,786 B2
(45) Date of Patent: Jul. 30, 2024

(54) CONTROLLER, SYSTEM AND METHOD FOR CONTROLLING THE STATE OF LIQUID CRYSTAL-BASED SWITCHABLE WINDOWS

(71) Applicant: Merck Patent GmbH, Darmstadt (DE)

(72) Inventors: Heiko Christ, Trebur (DE); Chuan Nie, Eindhoven (NL); Ties De Jong, En Utrecht (NL); Jasper Van Den Muijsenberg, Ba Nijmegen (NL)

(73) Assignee: MERCK PATENT GMBH, Darmstadt (DE)

( * ) Notice: Subject to any disclaimer, the term of this patent is extended or adjusted under 35 U.S.C. 154(b) by 235 days.

(21) Appl. No.: 17/631,921

(22) PCT Filed: Jul. 30, 2020

(86) PCT No.: PCT/EP2020/071457
§ 371 (c)(1),
(2) Date: Feb. 1, 2022

(87) PCT Pub. No.: WO2021/023607
PCT Pub. Date: Feb. 11, 2021

(65) Prior Publication Data
US 2022/0282566 A1 Sep. 8, 2022

(30) Foreign Application Priority Data
Aug. 2, 2019 (EP) ................................ 19189738

(51) Int. Cl.
*G02F 1/133* (2006.01)
*E06B 9/24* (2006.01)

(52) U.S. Cl.
CPC ............ *E06B 9/24* (2013.01); *G02F 1/13306* (2013.01); *E06B 2009/2464* (2013.01)

(58) Field of Classification Search
CPC . E06B 9/24; E06B 2009/2464; G02F 1/13306
See application file for complete search history.

(56) References Cited

U.S. PATENT DOCUMENTS

| | | | |
|---|---|---|---|
| 2004/0160660 A1 | 8/2004 | Malvino | |
| 2013/0271812 A1 | 10/2013 | Brown et al. | |
| 2016/0054633 A1* | 2/2016 | Brown | G01N 21/59 359/275 |

FOREIGN PATENT DOCUMENTS

| | | |
|---|---|---|
| CA | 2889978 A1 | 5/2014 |
| EP | 2287436 A2 | 2/2011 |
| WO | 2017/189307 A2 | 11/2017 |

OTHER PUBLICATIONS

International Search Report dated Nov. 2, 2020 issued in corresponding PCT/EP2020/071457 application (4 pages).

(Continued)

*Primary Examiner* — Anne M Hines
(74) *Attorney, Agent, or Firm* — Millen, White, Zelano & Branigan, P.C.; Brion P. Heaney

(57) ABSTRACT

A method for controlling the state of two or more liquid crystal-based switchable windows includes in a first step providing correction data which define a relationship between a state signal and an output voltage level. The correction data is provided for each of the switchable windows and the state of the switchable windows may be adjusted according to the state signal between a minimum and maximum level. In a subsequent step, the state signal is provided which defines the desired state of one or more selected switchable windows. In a further step, a required voltage level is determined for setting the desired state based on the state signal and the respective correction data for each of the one or more selected windows. In a subsequent step d), an AC output voltage is generated having the required voltage level for each of the one or more selected windows.

19 Claims, 3 Drawing Sheets

(56) References Cited

OTHER PUBLICATIONS

R. Baetens et al., "Properties, Requirements and Possibilities of Smart Windows For Dynamic Daylight and Solar Energy Control in Buildings: A State-of-the-Art Review", Solar Energy Materials & Solar Cells, vol. 94 (2010) pp. 87-105.

* cited by examiner

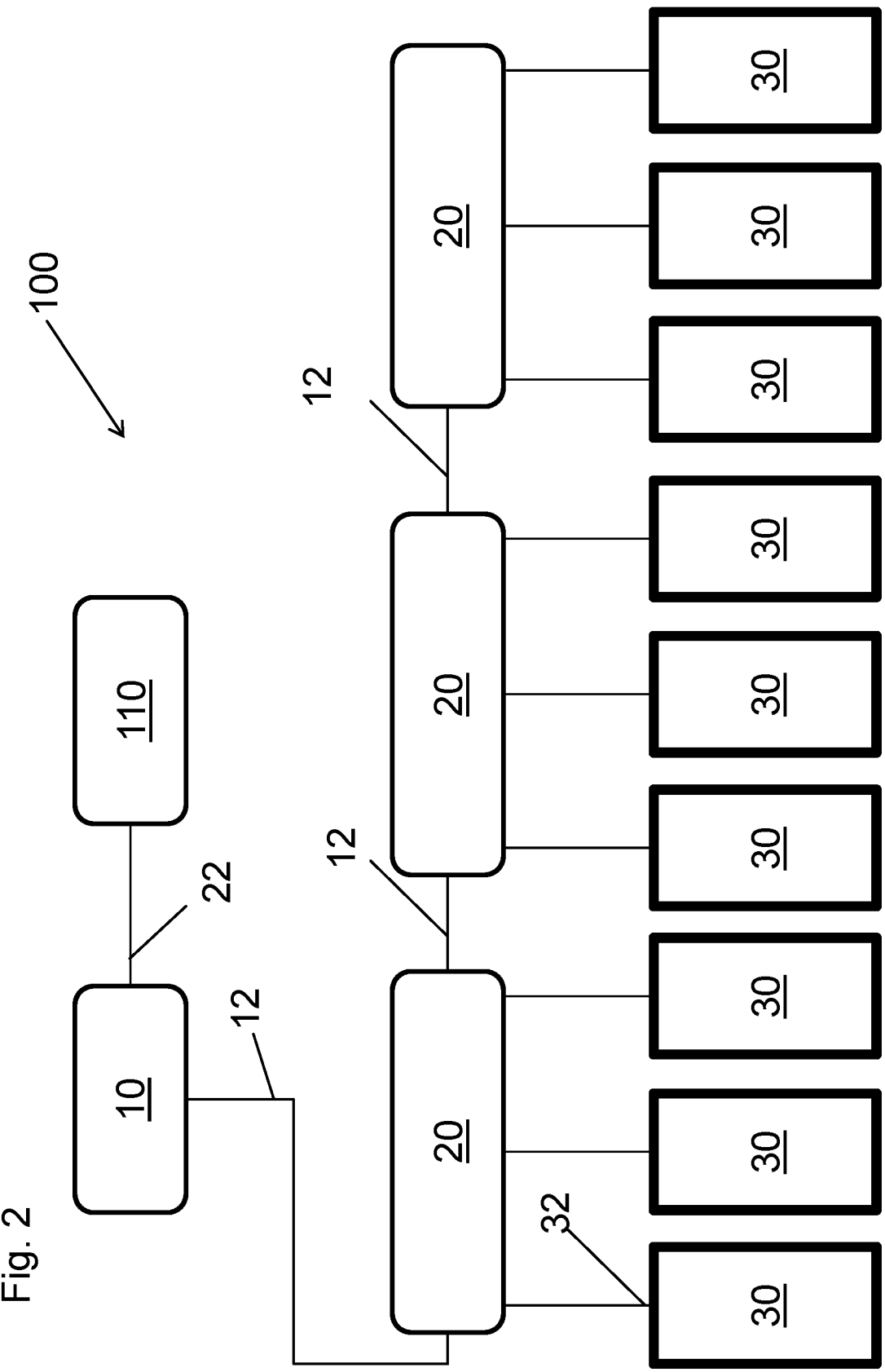

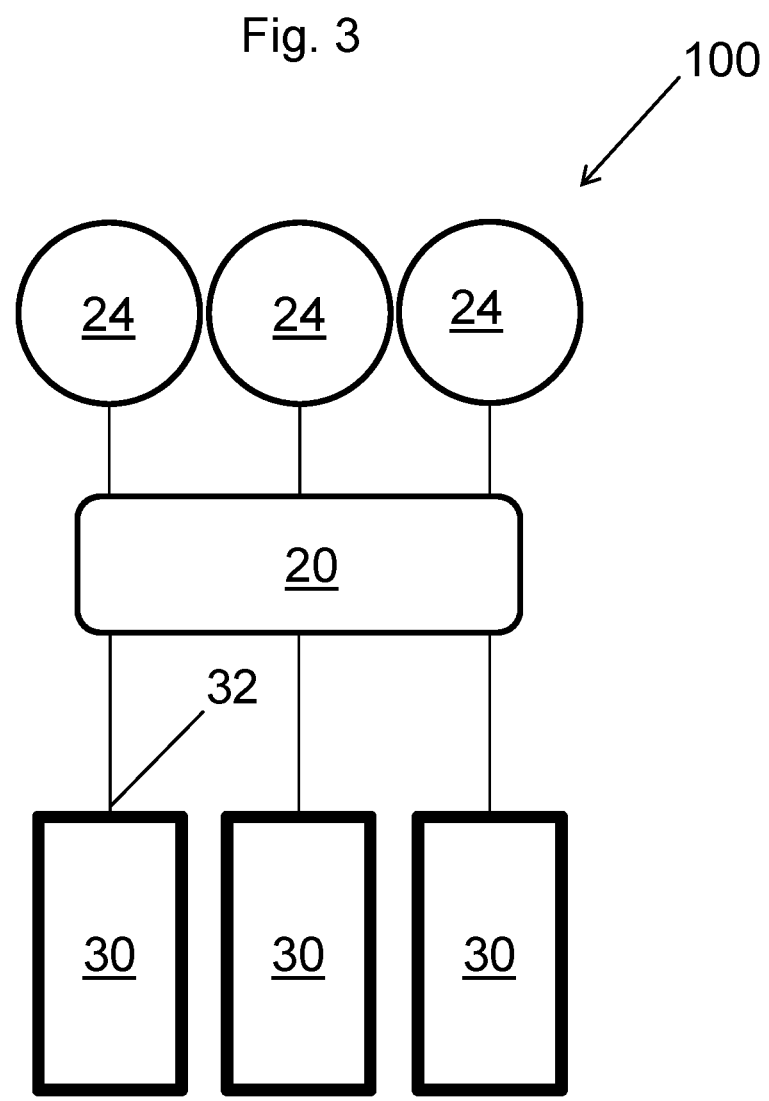

CONTROLLER, SYSTEM AND METHOD FOR CONTROLLING THE STATE OF LIQUID CRYSTAL-BASED SWITCHABLE WINDOWS

The invention relates to a method for controlling the state of two or more liquid crystal-based switchable windows. Further aspects of the invention relate to a controller for controlling the state of two or more liquid crystal based switchable windows and to a system comprising at least one such controller.

Switchable windows, which may be liquid crystal based, allow the control of transmission of light through the window by means of a driving signal which controls the state of the switchable window. Such switchable windows, also known as smart windows, are known in the art.

The review article by R. Baetens et al. "Properties, requirements and possibilities of smart windows for dynamic daylight and solar energy control in buildings: A state-of-the-art review", Solar Energy Materials & Solar Cells 94 (2010) pages 87-105 describes tintable smart windows. Smart windows can make use of several technologies for modulating the transmittance of light such as devices based on electrochromism, liquid crystal devices and electrophoretic or suspended-particle devices. Liquid crystal based devices employ a change in the orientation of liquid crystal molecules between two conductive electrodes by applying an electric field which results in a change of their transmittance.

Liquid crystal based devices usually comprise in this order a first substrate, a switchable layer and a second substrate. The switchable layer comprises at least one liquid crystalline material. The two substrates are coated with a transparent electrode to allow control of the switchable layer by means of an electric field.

In switchable windows, the device for modulating the transmittance of light, in the following referred to as switchable optical device, is usually laminated to a further sheet or carrier glass sheet or between two further substrates or carrier glass substrates for protection of the switchable optical device and for mechanical rigidity. In this lamination process, a glass sheet is bonded to a substrate of the switchable optical device by means of a thermoplastic interlayer. In the lamination process, the interlayer is arranged between the carrier glass sheet(s) and the at least one switchable optical device. In a subsequent treatment, which usually involves application of heat and/or elevated pressure or reduced pressure, the at least one sheet, the interlayer and the switchable optical device are bonded.

A smart window may comprise additional panes which form an insulated glazing unit. Further, the smart windows may comprise additional components such as frame for mechanically mounting of the switchable optical device and/or of further panes.

The state of the switchable window or more specifically of the at least one switchable optical device of the switchable window is controlled by providing a driving signal applied to the electrodes of the switchable optical device. A change of the driving signal results in a change of the state of the switchable optical device. Determination of the correct driving signal for achieving a specific state of the switchable window is difficult as the dependence of the state from the driving signal is non-linear and is also influenced by further parameters such as the size of the switchable window.

US 2004/160660 A1 discloses a voltage controlling device for supplying a voltage to a suspended particle device according to an input voltage. The light transmission of the suspended particle device is a nonlinear function of the supplied voltage which is dependent on the size of the suspended particle device. For linearization of a change of the light transmission in response to a change in the input voltage, the area of the suspended particle device is measured and the measurement is used to linearize the relationship between input voltage and change in light transmission.

US 2013/271812 A1 discloses a controller for a tintable window and a method for limiting energy consumption in a facility having at least one tintable window between an interior and exterior of the facility. A tinting of a tintable window is controlled automatically. A level of tint is determined based on a relationship between input signals from two or more sensors selected from an exterior photosensor, an interior photosensor, an occupancy sensor, an exterior temperature sensor and a transmissivity sensor which detects light passing through the tintable window from the exterior. A look-up table may be used to provide weighting constants for different combinations of input signals.

Usually, in architectural applications, such as a building or a façade of a building, a large number of smart windows are used. There is a need for a method for controlling the state of two or more liquid crystal based switchable windows which allows the setting of the respective state in a controlled and reproducible manner.

A method for controlling the state of two or more liquid crystal-based switchable windows is provided.

In a first step a) of the method, correction data is provided which defines a relationship between a state signal which defines the desired state and an output voltage level which defines the output voltage required to set the desired state, wherein the correction data is provided for each of the two or more switchable windows and wherein the state of the switchable windows may be adjusted according to the state signal between a minimum level and a maximum level.

In subsequent step b), the state signal is provided which defines the desired state of one or more selected windows of the two or more switchable windows.

In a further step c), a required voltage level is determined for setting the desired state based on the state signal and the respective correction data for each of the one or more selected windows.

In a subsequent step d), an AC output voltage is generated having the required voltage level for each of the one or more selected windows.

The switchable windows are liquid crystal-based and thus each of the switchable windows comprises at least one liquid crystal based switchable optical device which is controlled by the application of an electrical driving signal in the form of an AC voltage.

Preferably, the AC voltage does not have a DC component or respectively does not have a DC offset.

Preferably, the switchable windows may be arranged as an array, e.g. such as to form a contiguous façade, or alternatively the switchable windows may be placed in separate openings of a wall structure.

Preferably, the state is a tint level which defines the transmission of visible light through the respective switchable window and/or is a scattering level which defines the haze of the respective switchable window. The state of the switchable window or the switchable optical device of the switchable window may be adjusted between a minimum and a maximum level according to the provided state signal. The states may, for example, include a clear and transparent state, a dark state, a hazy state and mixtures of at least two of these states.

A switchable optical device of a first (tint) type may, for example, control the tint or the transmission of light through the switchable window and a switchable optical device of a second (scattering) type may, for example, control the haze of the switchable window.

Preferably, the switchable window comprises at least two switchable optical devices. Preferably, switchable optical devices of different types are combined. The switchable optical devices may be stacked on top of each other and joined, for example, by lamination or by means of an optically clear adhesive. The switchable window may, for example, have a first switchable optical device of the first type having a dark state and a clear bright state and may include a second switchable optical device of the second type having a hazy state and a clear state.

The switchable optical device is a liquid crystal based switchable optical device. Such a liquid crystal-based switchable optical device usually comprises in this order a first substrate, a switchable layer and a second substrate. The switchable layer comprises at least one liquid crystalline medium. The two substrates are each coated with a transparent electrode to allow control of the switchable layer by means of an electric field. The liquid crystalline medium may comprise further components such as spacers in order to ensure a uniform thickness of the liquid crystal based switchable layer.

The switchable layer of a liquid crystal based switchable optical device comprises a liquid-crystalline medium. A liquid-crystalline medium is defined as a substance having the properties of a liquid crystal. Typical liquid-crystalline media comprise at least one composition having elongated rod-shaped molecules. The liquid-crystalline media used in conjunction with the present invention have at least two states as well as intermediate states. The state of the liquid-crystalline medium is controlled using an electric field which is generated by an AC driving voltage applied between the two transparent electrodes. For providing driving signals to the two transparent electrodes, the switchable window may be connected to a controller.

Preferably, the switchable optical device is a liquid crystal (LC) device selected from modes based on either LC-dye mixtures/LC without dyes and modes described by geometry of twisted nematic, super twisted nematic, planar or vertical ECB nematic, Heilmeier, vertically aligned, twisted vertical aligned, highly twisted nematic, polymer stabilized cholesteric texture (PSCT), polymer networked liquid crystal (PNLC) or polymer dispersed liquid crystal (PDLC). The switchable optical device may include further functional layers such as, for example, color filters, alignment layers and/or polarizers. Optionally, two or more of such switchable optical devices may be stacked in the switchable window.

Preferably, the liquid crystal based switchable optical device additionally comprises an alignment film located on the first substrate layer and/or the second substrate layer. The alignment film is preferably arranged on the side facing the switchable layer. If an electrode is also located on the respective substrate layer, the alignment film is preferably arranged on the conductive electrode layer so that the alignment film is in direct contact with the switchable layer. The alignment film may be rubbed in an alignment direction.

The two substrate layers and the liquid-crystalline medium are arranged as a cell wherein the liquid-crystalline medium is placed in the gap formed by the two electrode layers. The size of the gap is preferably from 1 μm to 300 μm, preferably from 3 μm to 100 μm and more preferably from 5 μm to 100 μm, and most preferably from 10 μm to 50 μm. The cell is usually sealed by means of glue lines located at or near the edges.

In a switchable optical device of the first (tint) type, the amount of transmitted light is influenced by the switchable layer and is dependent on the state of the switchable layer.

Preferably, the transmission through the switchable optical device of the first type for the minimum tint state is at least 40% for light in the visible spectrum. More preferably the transmission is at least 50%. The visible spectrum is defined as light having a wavelength of from 380 nm to 780 nm. This definition is in accordance with EN 410.

Preferably, the transmission through the switchable optical device of the first type for the maximum tint state is less than 30% for light in the visible spectrum. More preferably the transmission is less than 10%.

In a switchable optical device of the second (scattering) type, haze (diffusive transmission) is caused by scattering of light occurring when light is passed through the switchable optical device.

Preferably, the haze H of a switchable optical device of the second type is at least 40% and more preferably at least 65% and most preferred at least 90% for the maximum haze state.

Preferably, the haze H is less than 10%, more preferably less than 5 and even more preferably less than 3% for the minimum haze state.

The haze H may be measured using a BYK haze-gard i instrument from BYK Gardner. The measurement and calculation are performed according to the norm ASTM D 1003-00.

According to step b) of the method, a state signal is provided which defines the desired state of one or more selected windows. Preferably, the state signal is provided as an analogue input signal or in form of a digital signal. Further, it is preferred that a state signal or state signals are provided for at least two of the two or more switchable windows.

An analogue signal may, for example, be provided in the form of a DC-voltage. For example, a potentiometer may be used to define the DC-voltage. The analogue signal may be directly provided to a controller which generates the AC output voltage for the one or more selected windows. Preferably, the controller comprises an analogue input port for each switchable window connected to the controller. The analogue signal may, for example be provided as a voltage ranging from 0 V to 10 V (for example when a potentiometer is used) or from 1 V to 10 V (if a dimmer switch is used).

A digital signal may be directly or indirectly provided to a controller which generates the AC output voltage. For example, a controller may be configured to directly receive digital information from devices such as a switch or a smart device such as a smart phone. In another example, signals from a switch or a smart device may first be sent to a communication module and/or a control unit which in turn sends a digital signal to the controller which generates the AC output voltage. The digital state signal has at least a state information which defines the desired state in form of number selected from a minimum value, corresponding to the minimum level of the state, and a maximum value, corresponding to the maximum level of the state. The state information may be provided in form of a fixed point, floating point or integer value. For example the state signal may have a state information in form of an integer number from 0 to 255.

In case a digital signal is used as state signal, the signal may provide additional information such as an identification number for identifying the switchable window or the switchable windows which is/are to be switched according to the state signal. In particular, a digital state signal may be provided for switching a single one of the switchable windows, for simultaneous switching of a group of selected switchable windows and/or for simultaneous switching of all switchable windows. In case an analogue signal is provided, it is preferred to provide independent analogue input ports for each of the switchable windows, wherein each if the input ports is assigned to a specific one of the switchable windows.

Still further, a building management system including a control unit may be provided wherein the control unit provides state signals in form of a digital signal directly or indirectly to a controller. The control unit may be connected to one or more data sources and may provide state signals in dependence on data, parameters and/or signals received from the data sources.

Preferably, the state signal is provided in dependence on a received alarm signal, wherein in case an alarm signal indicating a fire alarm is received a state signal corresponding to a minimum tint level is provided for all switchable windows, in case an alarm signal indicating a rampage situation is received a state signal corresponding to a maximum tint level and/or a maximum haze level is provided for all switchable windows, and in case an alarm signal indicating a bird flying in close proximity to a switchable window is received a state signal corresponding to a maximum tint level and/or a maximum haze level for the respective switchable window is provided.

The alarm signal may, for example, be provided by a control unit of a building management system which is connected to respective data sources.

By means of the proposed reactions to the described alarm signals, the switchable windows are set to the optimal state for the respective situation indicated by the alarm signal. For example, in case of a fire it is important that firefighters have a clear view into the building through the smart windows. On the other hand, in case of a rampage situation a clear view into the interior of a building should be prevented.

Further, for providing a bird protection function, it is sufficient to darken the switchable windows in close proximity to the bird in order to protect the bird from hitting a transparent smart window.

Preferably, the state signal is provided in dependence on one or more data sources selected from the group comprising interior photo sensors, exterior photo sensors, clocks, calendars, connections to communication devices, radar sensors, bird detection devices, interior temperature sensors, exterior temperature sensors, user input devices, noise sensors, room occupation sensors, power consumption sensors and historical climate databases.

By means of clocks and calendars state signals may, for example, be provided in dependence of a calculated position of the sun for the respective location of the smart windows. Accordingly, smart windows facing towards the current position of the sun may be set to a tinted state and other windows may be set to a bright state.

By means of the connections to communication devices, the state signal may, for example, be provided in dependence on an incoming phone call, an incoming text message or an incoming email. For example, smart windows which are assigned to a room in which a communication device is located may alternate between a bright state and a darker tinted state in order to provide an indication of an incoming communication.

User input devices may, for example, be selected from the group comprising switches, such as on/off switches or dimmer switches, and smart devices such as smart phones and tablet computers. Such user input devices may be used to allow a user to manually input preferred conditions.

Interior and/or exterior photo sensors may be used to react to the actual lighting situation of a room and accordingly to provide respective state signals for smart windows assigned to this room. Similarly, interior and/or exterior temperature sensors may be used to set a state of the smart windows such that a desired temperature in a room is maintained. For example, if the temperature in the room is below the desired temperature, smart windows assigned to this room may be set to a bright state in order to allow more light and thus more heat to enter the room and if the temperature in the room is above the desired temperature, the smart windows may be set to a dark tinted state in order to block light and heat from entering the room.

Noise sensors may be used to react to sound and/or noise detected in a room. For example, smart windows assigned to a room may be switched depending on the detected noise level to provide a disco light-like effect.

Room occupation sensors may be used to react to the presence of people inside a room.

Power consumption sensors may be used to detect the current power consumption of the building. For example, certain functions such as providing a uniform appearance of a façade of the building may be suspended in case the power consumption of the building exceeds a preset limit value. Limiting the peak power consumption of a building may be useful in order to receive lower pricing from a utility supplying electric power.

In an embodiment one or more sensors are integrated in one or more of the liquid crystal-based switchable windows. The provision and use of such in situ sensors can give direct information on local or internal conditions.

Information on historical climate data may, for example, be used to provide information on the expected heat input due to solar radiation for a certain day and to control the transmission of the smart windows accordingly.

For providing the optimum state signal for controlling the temperature of a room, it is preferred to further consider the U-value and the g-value. The U-value describes the thermal transmittance which in case of a room is the rate of heat transfer from the inside of the room to the outside. The g-value, also known as solar heat gain, describes the increase in thermal energy of a room when solar radiation is absorbed.

A control method for controlling the temperature of a room may combine several of the data sources. For example, a control method may consider a predetermined U-value, g-value, expected solar radiation based on location, time and date as well as the input of photo sensors and temperature sensors.

Preferably, the state signal is provided taking into account the position of the respective switchable window in a façade of a building and a desired pattern.

The pattern may be selected to use the building's façade to display text or images, wherein each of the smart windows of the façade is used as a pixel. This is particular useful if the smart windows are arranged in a grid-like arrangement. The image and/or text may be supplied to a building management system which in turn provides the required state signals to cause the smart windows at the respective positions indicated by the pattern to switch their state such that the desired image and/or text becomes visible.

The provided correction data makes it possible to map the state signal to the required voltage level for achieving the desired state of the respective switchable window. The exact response of the switchable window to the AC output voltages and thus the required voltages for the maximum and minimum levels are usually dependent on the specific liquid crystal based switchable optical device of the switchable windows and the size of the switchable optical device. Further, the required voltages may depend on further parameters such as the environmental conditions or the physical parameters of the switchable optical device may change over time due to aging. By means of the correction data, a linear response of the switchable window to a change in the state signal may be achieved.

Preferably, the correction data is provided in form of a set of parameters for a mathematical function and/or in form of a look-up table.

If the same set of parameters for a mathematical function and/or look-up table is used for more than one window, it is preferred to store each individual set of parameters and/or look-up table only once and providing a reference for each of the smart windows indicating which of the stored sets of parameters and/or look-up tables to use. This allows for an efficient use of storage space.

In case a look-up table is used, linear interpolation is preferably used to determine the required voltage level for a state signal which has a value between two entries of the table.

If a mathematical function is used, the function may provide a relationship between the required voltage level and the size of the respective switchable window in order to account for the size dependent voltage drop across the transparent electrodes.

In case a mathematical function is used, the function may be used to compensate for changes of properties of the switchable windows, for example due to temperature or age.

Preferably, sensors which measure the transmission through a smart window may be provided and may be used to determine the respective correction data. In particular, sensors may be used to automatically determine the parameters of the mathematical function or the entries of the look-up table.

Preferably, the correction data may be updated in dependence of a calibration measurement and/or sensor feedback. For example, sensors may be provided for monitoring the light transmission through a smart window in dependence on the applied AC output voltage. If the light transmission observed by the sensor is not in accordance with the intended light transmission according to the provided state signal, the correction data may be updated.

Preferably, the provided correction data is selected such that the resulting output voltages will cause each of the two or more switchable windows to switch to essentially the same state for the same state signal. For example in case of tint as state of the smart windows, a transmission of all switchable windows wherein the absolute difference in transmission is less than 10%, preferably less than 5% is considered to be the same state.

Accordingly, by means of the proposed method it is possible to uniformly switch all windows of a building or of a façade in a consistent and identical manner. This ensures a uniform and aesthetically pleasing appearance of the building or of the façade. Further, by means of the proposed method it is not necessary to consider window specific settings or properties in higher level systems such as a control unit of a building management system or in the setup of data sources such as switches. For example, a user controllable switch, in particular a dimmer switch, will always perform in the same way regardless of the specific smart window and without having to configure the respective dimmer.

After the required voltage has been determined according to step c) of the method, the AC output voltage is generated according to step d) and is supplied to the one or more selected windows. The two transparent electrodes of each of the smart windows form plates of a capacitor so that the AC output voltage will cause charging and discharging currents.

Preferably, phases of at least two AC output voltages are shifted with respect to each other. By phase shifting of the AC output voltages, a peak current required for driving the plurality of the smart windows is reduced. For example, if two smart windows are connected to a single controller and the generated AC output voltages are all in phase, the electrical current is two times the peak current of a single smart window. If the two generated AC output voltages are out of phase, the peak electrical current may be significantly reduced.

Preferably, AC output voltages for N of the two or more switchable windows are provided, wherein the output voltage for the n-th window is phase shifted by an amount of $(n-1)*(2\pi)/N$ for n from 1 to N. Such a distribution of the phases allows for optimal reduction of current peaks.

Preferably, the AC output voltage is a square wave AC voltage or a trapezoid wave AC voltage. In order to ensure a specific orientation of the liquid-crystalline medium of the switchable optical devices and thus for ensuring that the respective switchable optical device has a defined state a certain electric field and thus a certain voltage level is required. Using a square-wave or trapezoid wave AC voltage ensures that this required electric field is present for the maximum possible time period.

Preferably, the frequency of the AC output voltage is in the range of from 20 Hz to 75 Hz.

When driving the smart windows using the AC output voltage, a charging current flows to the respective switchable window for a rising edge of the AC voltage and a discharge current flows from the respective switchable window for a falling edge of the AC voltage. Preferably, electrical energy is recuperated during the falling edge of the AC voltage. The recuperated electrical energy may, for example, be stored in an energy storage means such as a capacitor and may be used for providing the charging current for a different one of the smart windows or may be used for providing the charging current for the same smart window at a later point in time.

Preferably, an output terminal for outputting the AC voltage is monitored for a DC offset and if a DC offset is detected, a DC bias of the AC output voltage is adjusted in order to control the DC offset at the output terminal to a target value of zero. It is especially preferred to monitor the respective output terminals for all smart windows.

Such a monitoring of the output terminals for DC offsets ensures that there is no buildup of a DC offset at one or more of the smart windows which may be harmful for the performance of the liquid crystal based devices.

The proposed methods are particularly useful to control the state of multiple smart windows in a uniform and predictable manner. However, the proposed methods including the steps of providing correction data, providing a state signal, determining the required voltage level and generating the AC output voltage may in principle be used to control the state of a single liquid crystal-based switchable window.

It is a further aspect of the invention to provide a controller for controlling the state of two or more liquid crystal based switchable windows. The controller comprises a storage memory for storing correction data for each of the two or more switchable windows, an input port for receiving a state signal which defines the desired state of one or more selected windows of the two or more switchable windows, a processor configured to generate a driving signal for each of the switchable windows in dependence on the state signal and the respective correction data and amplifiers for each of the two or more switchable windows for amplifying the driving signal and for providing an AC output voltage for each of the switchable windows.

The controller is configured to execute one of the methods described herein. Accordingly, features described with respect to one of the methods also apply to the controller and vice versa features described with respect to the controller also apply to the methods.

Preferably, the controller comprises a non-volatile memory such as, for example a flash rom or EEPROM (electrically erasable programmable readonly memory) memory. The controller may comprise means for reprogramming the memory in case the correction data must be updated.

Preferably, the amplifiers are configured as four quadrant buck converters and the controller additionally comprises a DC-buffer for storing recuperated energy. The four quadrant buck converter may operate in all four U/I quadrants so that positive and negative output voltages as well as positive and negative electrical currents may be generated. Such an amplifier may be used to recuperate electrical energy when a smart window acting as a capacitor is discharged at the falling edge of the AC output signal. The recuperated energy may then be stored in the DC-buffer.

Preferably, the DC-buffer is configured as a capacitor.

The controller is configured to provide the AC output signal for more than one connected switchable window. For example, the controller may be configured to provide AC output signals for 2 to 64 switchable windows. In a particular example, the controller is configured to provide the AC output signals for 8 switchable windows. Preferably, the controller comprises an amplifier for each connected switchable window.

Preferably, the controller further comprises communication means configured to send and receive information over a communication bus. The communication bus may, for example, be used to receive a digital state signal. Additionally, the communication means may be configured to exchange information between two or more controllers via the communication bus. For example, the exchanged information may be used to synchronize operation of two or more controllers and/or to coordinate phase shifting of the phase of the respective AC output voltages.

Preferably, the controller further comprises at least one analogue input for receiving an analogue state signal. Preferably, the controller comprises one analogue input for each of the smart windows connected to the controller.

In a further aspect of the invention, a system for controlling the state of two or more switchable windows is provided which comprises one or more of the described controllers and a communication module, wherein the communication module and the one or more controllers are adapted to communicate by means of a first communication protocol and the communication module is further adapted to communicate by means of a second communication protocol.

The first communication protocol may, for example, be RS485 or a device or circuit internal communication protocol such as I²C.

The second communication protocol may, for example, be selected from KNX, BACnet, Ethernet, Dali, LON, ZigBee, Bluetooth, IoT, Modbus, CAN-open, Ethernet/IP, Powerlink, DeviceNet, LCN, EnOcean, Z-Wave, Profinet, eBus, EtherCat, Profibus, X10 and OpenTherm.

The system may be configured as a building management system having a control unit which is connected to one or more data sources. The control unit is configured to provide state signals in dependence on data received from the one or more data sources and to send these signals to the one or more controllers by means of the communication module.

The control unit may be configured as a separate device. Further, it is possible to provide the control unit and the communication module in form of a single integrated device.

Accordingly, the control unit may be provided with interfaces for connections to data sources such as interior photo sensors, exterior photo sensors, clocks, calendars, connections to communication devices, radar sensors, bird detection devices, interior temperature sensors, exterior temperature sensors and user input devices.

In another aspect of the invention a system is provided comprising the building management system and two or more liquid crystal-based switchable windows which are connected to the building management system.

BRIEF DESCRIPTION OF THE DRAWINGS

The drawings show:

FIG. 1a depicts a diagram showing schematically a typical dependence of a transmission $T_{vis}$ of visible light through a smart window in dependence on a state signal in form of an analogue input signal $V_{input}$. As can be seen from the diagram of FIG. 1a, the change of transmission in dependence on the analogue input signal $V_{input}$ is strongly non-linear. In a first part of the diagram, the transmission $T_{vis}$ is nearly constant and changes only slightly for changing input signal $V_{input}$. In a second part of the diagram, $T_{vis}$ changes rapidly even for small changes in the input signal $V_{input}$. Then, in a third part of the diagram, the transmission saturates and again changes only slightly for changing $V_{input}$. This non-linear switching behavior is typical for liquid-crystal based switchable windows. The exact shape and in particular the required voltages for the maximum and minimum level of the transmission $T_{vis}$ are usually dependent on the specific liquid-crystal based switchable optical device of the windows and the size of the switchable optical device. Further, the required voltages may depend on further parameters such as the environmental conditions or the physical parameters of the switchable optical device may change over time due to aging.

In a typical application, the analogue input signal $V_{input}$ would be provided by means of a dimmer switch which is to be manually operated by a user. The strong non-linear response of the transmission $T_{vis}$ would be unexpected by the user and makes it difficult to set the transmission $T_{vis}$ to the desired value.

Figure 1A:
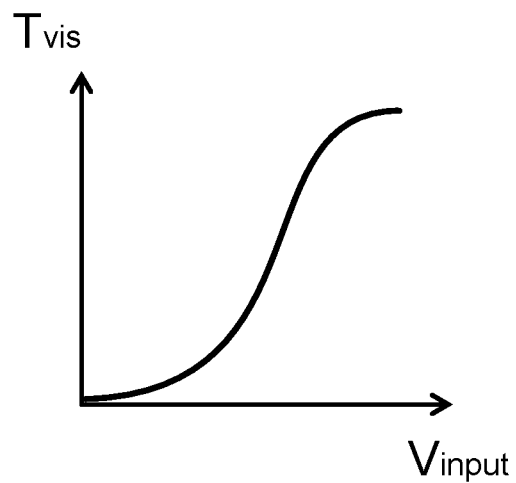
FIG. 1a a typical non-linear response of a transmission through a smart window in dependence on an analogue input signal, FIG. 1b a linearized dependence of the transmission on the analogue input signal, FIG. 2 an example of a building management system, and FIG. 3 the control of the states of multiple smart windows by means of analogue input signals.
Figure 1B:
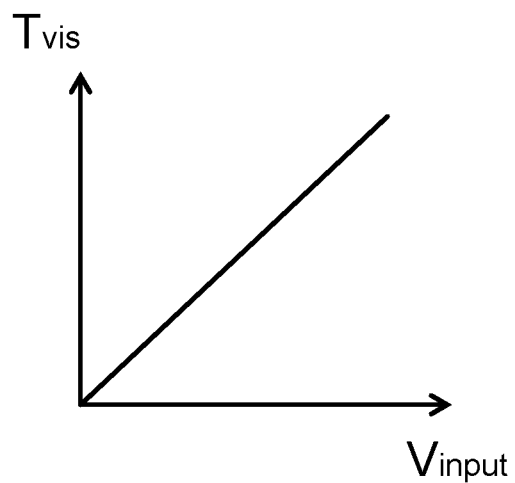

FIG. 1b depicts a diagram showing a linearized dependence of the transmission $T_{vis}$ of visible light through a smart window in dependence on the state signal in form of an analogue input signal $V_{input}$. Such a linearization may be provided by applying the proposed method to determine the required output voltage for achieving the desired state in dependence on provided correction data and the analogue input signal $V_{input}$. As can be seen from the diagram of FIG. 1b, the change of transmission in dependence on the analogue input signal $V_{input}$ is linear. Thus, the desired state of the transmission $T_{vis}$ may be easily set by means of, for example, a dimmer switch.

FIG. 2 shows a schematic view of a building management system 100 for controlling the state of a plurality of switchable windows 30. In the example depicted in FIG. 2, the building management system 100 controls the state of nine switchable windows 30.

In principle, the spatial arrangement of the switchable windows 30 relative to each other can be chosen as desired in the respective application, e.g. such as to form a façade of a building. In an embodiment the switchable windows 30 are arranged as a contiguous array, column or row. In another embodiment the switchable windows 30 are arranged in separate openings of a solid structure such as a wall.

Each of the switchable windows 30 has an electrical connection 32 for connecting the respective switchable windows 30 to a controller 20. By means of the electrical connection 32, the controller 20 provides an AC output voltage for driving of the respective switchable window 30. In the example shown in FIG. 2, the building management system 100 comprises three controllers 20, wherein each of the controllers 20 is configured for providing the AC output voltage for three switchable windows 30. In further embodiments, the controller 20 may be configured for a different number of switchable windows 30. For example, the controller 20 may be configured to provide the AC output voltage for 2 to 512 windows. Further, the building management system 100 may comprise a different number of controllers 20, for example from 1 to 64 controllers 20.

The three controllers 20 are interconnected by means of a first communication bus 12 and are configured to communicate by means of a first communication protocol. The first communication protocol may be, for example, RS485. The use of the first communication bus 12 allows coupling of several controllers 20 in order to expand the number of switchable windows 30 which may be connected to the building management system 100.

The controllers 20 are configured to provide the AC output voltage to the respective switchable windows 30 in dependence on state signals and correction data. In the building management system 100 of FIG. 2, a control unit 110 is used to provide the state signals.

The control unit 110 is configured to communicate by means of a second communication protocol which is, for example, the KNX protocol. For communicating with the controllers 20, the building management system 100 further comprises a communication module 10. The communication module 10 is adapted for communication using the first and the second communication protocol and is adapted to forward the state signals provided by the control unit 110 to the controllers 20. Accordingly, a second communication bus 22 connects the control unit 110 to the communication module 10 and the first communication bus 12 connects the communication module 10 to the controllers 20.

For controlling the state of all switchable windows 30 or of a selection of the switchable windows 30, the control unit 110 provides state signals for all or the selected ones of the switchable windows 30. These state signals may be prepared in dependence on external input or sensors which are connected to the control unit 110. The state signals are provided in form of a digital signal and are first sent using the second communication protocol over the second communication bus 22 to the communication module 10. The communication model 10 then translates the communication protocol and forwards the state signal to the respective controllers 20 using the first communication protocol over the first communication bus 12.

After receipt of the digital state signal by the respective controllers 20 a required voltage level for setting the desired state according to the state signal is determined based on the state signal and correction data. The correction data may, for example be stored in a non-volatile memory of the respective controller 20. Finally, the controllers 20 generate an AC output voltage for each of the selected switchable windows 30 according to the determined required voltage level.

FIG. 3 shows a second embodiment of the building management system 100 comprising a single controller 20 and three switchable windows 30 which are connected to the controller 20 using electrical connections 32. In the embodiment of FIG. 3, the state signals for defining the state of each of the three switchable windows 30 are provided in form of an analogue signal. The analogue signals are each provided using analogue input devices 24 which may, for example, be configured as dimmer switches.

After receipt of the analogue state signal by the controller 20 a required voltage level for setting the desired state according to the state signal is determined based on the state signal and correction data. The correction data may, for example be stored in a non-volatile memory of the controller 20. Finally, the controller 20 generates an AC output voltage for each of the selected switchable windows 30 according to the determined required voltage level.

Working Examples

Two liquid crystal-based switchable windows are prepared using ITO-coated glass substrates, a double cell configuration with cell gaps of 25 μm and a dye-doped liquid crystal medium which has a positive dielectric anisotropy. The first window, designated as W-A, has a size of 1 m×1 m. The second window, designated as W-B, has a size of 3 m×1 m.

Voltage is supplied to both windows via a driver for which respectively 11 values can be pre-set in a look-up table with a resolution range of 1000.

The transmission of light in the visible spectral range ($T_{vis}$) is determined for both windows in dependence of the applied voltage. The transmission is normalized with respect to the darkest state (0% transmission) and the brightest state (100% transmission).

Table 1 shows the voltage-transmission behaviour for windows W-A and W-B at 20° C.

TABLE 1

| $T_{vis}$ | Voltage (V) for W-A | Voltage (V) for W-B |
|---|---|---|
| 0% | 1.3 | 2.0 |
| 10% | 1.6 | 2.2 |
| 20% | 1.8 | 2.5 |
| 30% | 2.0 | 2.8 |
| 40% | 2.2 | 3.1 |
| 50% | 2.5 | 3.5 |
| 60% | 2.9 | 4.1 |
| 70% | 3.5 | 4.9 |

TABLE 1-continued

| $T_{vis}$ | Voltage (V) for W-A | Voltage (V) for W-B |
|---|---|---|
| 80% | 4.7 | 6.6 |
| 90% | 7.2 | 10.0 |
| 100% | 17.0 | 24.0 |

Based on these data a look-up table is compiled to apply the same voltage-transmission response for both windows for $T_{vis}$ increments between 0% and 100%. Considering the driver's output resolution of 1000 and the maximum applied voltage of 24 V as used for W-B at $T_{vis}$ of 100% transmission (i.e. the brightest state), for each normalized $T_{vis}$ step the desired value can be calculated according to the relation 1000*voltage/24 V. The resulting look-up table (LUT) is shown in Table 2.

TABLE 2

| $T_{vis}$ | LUT for W-A | LUT for W-B |
|---|---|---|
| 0% | 54 | 83 |
| 10% | 67 | 92 |
| 20% | 75 | 104 |
| 30% | 83 | 117 |
| 40% | 92 | 129 |
| 50% | 104 | 146 |
| 60% | 121 | 171 |
| 70% | 146 | 204 |
| 80% | 196 | 275 |
| 90% | 300 | 417 |
| 100% | 708 | 1000 |

For the same windows W-A and W-B the voltage-transmission behaviour as shown in Table 3 and the look-up table as shown in Table 4 are obtained accordingly at 80° C.

TABLE 3

| $T_{vis}$ | Voltage (V) for W-A | Voltage (V) for W-B |
|---|---|---|
| 0% | 1.3 | 2.0 |
| 10% | 1.6 | 2.2 |
| 20% | 1.8 | 2.5 |
| 30% | 1.9 | 2.7 |
| 40% | 2.1 | 2.9 |
| 50% | 2.3 | 3.2 |
| 60% | 2.7 | 3.8 |
| 70% | 3.2 | 4.5 |
| 80% | 4.1 | 5.7 |
| 90% | 6.1 | 8.6 |
| 100% | 17.5 | 24.0 |

TABLE 4

| $T_{vis}$ | LUT for W-A | LUT for W-B |
|---|---|---|
| 0% | 54 | 83 |
| 10% | 67 | 92 |
| 20% | 75 | 104 |
| 30% | 79 | 113 |
| 40% | 88 | 121 |
| 50% | 96 | 133 |
| 60% | 113 | 158 |
| 70% | 133 | 188 |
| 80% | 171 | 238 |
| 90% | 254 | 358 |
| 100% | 729 | 1000 |

Reference Numerals 10 communication module
12 first communication bus
20 controller
22 second communication bus
24 analogue input device
30 switchable window
32 electrical connection
100 building management system
110 control unit

The invention claimed is:

1. A method for controlling the state of two or more liquid crystal-based switchable windows (30) comprising:
providing correction data which defines a relationship between a state signal which defines the desired state and an output voltage level which defines the output voltage required to set the desired state, wherein the correction data is provided for each of the two or more switchable windows (30) and wherein the state of the switchable windows (30) may be adjusted according to the state signal between a minimum level and a maximum level,
providing the state signal which defines the desired state of one or more selected windows of the two or more switchable windows (30),
determining a required voltage level for setting the desired state based on the state signal and the respective correction data for each of the one or more selected windows, and
generating an AC output voltage having the required voltage level for each of the one or more selected windows,
wherein an output terminal for outputting the AC voltage is monitored for a DC offset and if a DC offset is detected, a DC bias of the AC output voltage is adjusted in order to control the DC offset at the output terminal to a target value of zero.

2. The method according to claim 1, wherein the state signal is provided as an analogue input signal.

3. The method according to claim 1, wherein the state is a tint level which defines the transmission of visible light through the respective switchable window (30).

4. The method according to claim 3, wherein the state signal is provided in dependence on a received alarm signal, wherein
in case an alarm signal indicating a fire alarm is received a state signal corresponding to a minimum tint level is provided for all switchable windows (30),
in case an alarm signal indicating a rampage situation is received a state signal corresponding to a maximum tint level and/or a maximum haze level is provided for all switchable windows (30), and
in case an alarm signal indicating a bird flying in close proximity to a switchable window (30) is received a state signal corresponding to maximum tint level and/or a maximum haze level for the respective switchable window (30) is provided.

5. The method according to claim 1, wherein the state signal is provided in dependence on one or more data sources selected from the group comprising interior photo sensors, exterior photo sensors, clocks, calendars, connections to communication devices, radar sensors, bird detection devices, interior temperature sensors, exterior temperature sensors, user input devices, noise sensors, room occupation sensors, power consumption sensors and historical climate databases.

6. The method according to claim 1, wherein providing of the state signal takes into account the position of the respective switchable window (30) in a façade of a building and a desired pattern.

7. The method according to claim 1, wherein the correction data is provided in form of parameters for a mathematical function and/or in form of a look-up table.

8. The method according to claim 1, wherein the provided correction data is selected such that the resulting output voltages cause each of the two or more switchable windows (30) to switch to essentially the same state for the same state signal.

9. The method according to claim 1, wherein phases of at least two AC output voltages are shifted with respect to each other.

10. The method according to claim 9, wherein AC output voltages for N of the two or more switchable windows (30) are provided, and wherein the AC output voltage for the n-th window is phase shifted by an amount of $(n-1)*(2\pi)/N$ for n from 1 to N.

11. The method according to claim 1, wherein the AC output voltage is a square wave AC voltage.

12. The method according to claim 1, wherein a charging current flows to the respective switchable window (30) for a rising edge of the AC output voltage and a discharge current flows from the respective switchable window (30) for a falling edge of the AC output voltage, and electrical energy is recuperated during the falling edge of the AC output voltage.

13. A controller (20) for controlling the state of two or more liquid crystal-based switchable windows (30) comprising a storage memory for storing correction data for each of the two or more switchable windows (30), an input port for receiving a state signal which defines the desired state of one or more selected windows of the two or more switchable windows (30), a processor configured to generate a driving signal for each of the switchable windows (30) in dependence on the state signal and the respective correction data and amplifiers for each of the two or more switchable windows (30) for amplifying the driving signal and for providing an AC output voltage for each of the switchable windows (30), wherein the controller (20) is configured to execute the method according to claim 1.

14. The controller (20) according to claim 13, wherein the amplifiers are configured as four quadrant buck converters and the controller additionally comprises a DC-buffer for storing recuperated energy.

15. A building management system (100) for controlling the state of two or more switchable windows (30) comprising one or more controllers (20) according to claim 13, a control unit (110) and a communication module (10), wherein the communication module (10) and the one or more controllers (20) are adapted to communicate by means of a first communication protocol and the communication module (10) is further adapted to communicate by means of a second communication protocol with the control unit (110).

16. A system comprising the building management system (100) according to claim 15 and two or more liquid crystal-based switchable windows (30), wherein the two or more liquid crystal-based switchable windows (30) are connected to the building management system (100).

17. The method according to claim 1, wherein the state signal is provided in form of a digital signal.

18. The method according to claim 1, wherein the state is s a scattering level which defines the haze of the respective switchable window (30).

19. The method according to claim 1, wherein the AC output voltage is a trapezoid wave AC voltage.

* * * * *